United States Patent
Campbell

(10) Patent No.: US 8,218,041 B2
(45) Date of Patent: Jul. 10, 2012

(54) APERTURE SHADING CORRECTION

(75) Inventor: Scott P. Campbell, Thousand Oaks, CA (US)

(73) Assignee: Digital Imaging Systems GmbH, Kirchheim/Teck-Nabern (DE)

( * ) Notice: Subject to any disclaimer, the term of this patent is extended or adjusted under 35 U.S.C. 154(b) by 335 days.

(21) Appl. No.: 12/658,030

(22) Filed: Feb. 1, 2010

(65) Prior Publication Data

US 2011/0187904 A1 Aug. 4, 2011

(51) Int. Cl.
- H04N 9/64 (2006.01)
- H04N 5/208 (2006.01)
- H04N 5/225 (2006.01)
- H04N 1/40 (2006.01)
- G06K 9/40 (2006.01)

(52) U.S. Cl. ........ 348/251; 348/252; 348/363; 348/335; 382/274; 358/461

(58) Field of Classification Search .................. 348/251, 348/252, 363, 335, 340; 382/274; 358/461
See application file for complete search history.

(56) References Cited

U.S. PATENT DOCUMENTS

| | | | |
|---|---|---|---|
| 5,012,268 A | | 4/1991 | Hirai |
| 5,381,174 A | | 1/1995 | de Groot et al. |
| 5,602,412 A | * | 2/1997 | Suzuki et al. ................. 348/251 |
| 6,937,777 B2 | * | 8/2005 | Shirakawa .................... 382/274 |
| 7,449,802 B2 | | 11/2008 | Sasaki et al. |
| 7,460,728 B2 | * | 12/2008 | Kawanishi et al. ........... 382/274 |
| 7,692,700 B2 | * | 4/2010 | Johannesson et al. ........ 348/251 |
| 2005/0275904 A1 | * | 12/2005 | Kido et al. .................... 358/461 |
| 2007/0230937 A1 | * | 10/2007 | Ide et al. ....................... 396/125 |
| 2009/0002526 A1 | * | 1/2009 | Koishi .......................... 348/241 |

* cited by examiner

Primary Examiner — Nhan T Tran
(74) Attorney, Agent, or Firm — Salie Ackerman LLC; Stephen B. Ackerman

(57) ABSTRACT

In camera systems with more than one aperture plane, light from different object points can be shaded by either the lens' pupil, the system's aperture or both. depending on pupil and aperture diameters, separation and camera system field of view. In an aperture shading correction (ASC) algorithm, the shading that results from the convolution of the lens' pupil function and its aperture function is determined over the image plane for any given pupil and aperture diameter and separation. A shading correction function is then calculated, and/or its parameters are determined, that will undo the adverse relative illumination degradations that result from the tandem pupil and aperture. This can be done in separate color planes. This can be done in tandem with standard lens shading correction that must also be corrected for (i.e., the lens shading correction (LSC) can be performed in the sensor for the case of no aperture shading, then the ASC multiples the LSC during aperture shading). Aperture shading will also impact SNR and MTF, and as such the tuning of these parameters will also benefit from ASC knowledge.

15 Claims, 6 Drawing Sheets

(b)

(a)

(d)

(c)

(b)

(a)

(c)

(d)

APERTURE SHADING CORRECTION

BACKGROUND OF THE INVENTION (1) Field of the Invention

This invention relates generally to the correction of aperture shading effects on images and relates more specifically to shading correction on images from digital cameras with more than one aperture plane wherein the said aperture planes are axially distended from one another.

(2) Description of the Prior Art

Photographically, vignetting means the darkening of the corners relative to the centre of an image. All camera lenses suffer, more or less, of these optical phenomena.

A simple lens obeys an optical law called the "cos-$4^{th}$ law" (cosine of the angle of incidence off the lens axis to the $4^{th}$ power. The cos-$4^{th}$ influence comes from a number of factors, including that the light gets spread out over a larger area, and that the corners of the image are further away from the center of the lens than the on-axis part of the image. This means that for a lens with an angle of view of 20 degrees, where the maximum off-axis angle of incidence is 10 degrees, the corners receive cos (10 degrees) to the $4^{th}$ power as much light as the center. Cos (10 degrees) is 0.9848, so to the $4^{th}$ power is 0.9406.

Therefore the corners get 94 percent as much light as the center, a generally imperceptible difference. A 20-degree angle of view for a 35 mm camera equates to a 123 mm lens. For a 28 mm lens, with a 75-degree angle of view, cos 4th comes to 0.39. So now the corners only get 39 percent of the light that the center gets. For a 20 mm lens this goes down to 21 percent, and for a 15 mm lens this goes down to 10.5 percent. Obviously the last case is unworkable and is not acceptable.

In many imaging systems, more than one aperture or pupil may exist in the optical path. Rays that become obstructed by these apertures or pupils do not make it from the object plane to the image plane, and are therefore "shaded" out of the image (this process is also called Vignetting). When one such pupil or aperture plane exists, the shading generally follows a cosine-fourth relationship with ray angle as outlined above. Such shading is generally called lens shading, and is often corrected for in modern digital cameras by a lens shading correction (LSC) algorithm. However, when multiple pupils or apertures exist in the optical path, each axially distended from another, the shading effects become more complicated and additional efforts must be taken to counter these shading effects.

In order to solve said problems with vignetting, cameras are using typically complex optical systems, which are very expensive to manufacture. It is a challenge for the designers of digital cameras to design a camera having very low vignetting at reasonable costs.

Solutions dealing with the suppression of vignetting are described in the following patents:

U.S. patent (U.S. Pat. No. 5,381,174 to de Groot et al.) teaches how for correcting vignetting in the upper or lower range of the pick-up area of opto-electric transducers of a multi-channel color television camera with zoom lens, a representative signal is derived from the diaphragm aperture setting and from the zoom setting. Dependent on corresponding signals for the minimum diaphragm aperture, on the one hand, and the minimum values for wide-angle and tele-setting of the zoom range, on the other hand, these representative signals generate control voltages with which the level of a field frequency saw-tooth signal is controlled.

U.S. patent (U.S. Pat. No. 7,449,802 to Sasaki et al.) discloses an apparatus and method for excluding vignetting occurring during wide-angle shooting using a camera. When a focal length of the camera is computed and an ISO range is set using a result of measuring an amount of light, a view angle wider than the inherent view angle of a camera module can be provided. Therefore, vignetting can be removed and an image of an area wider than the current capture range can be captured. The method for excluding vignetting in a digital camera, comprising the steps of measuring a focal length and an amount of light for an image input from a lens, detecting vignetting and performing an image sensitivity compensation for a vignetting area, and providing a user with an image based on information output from a vignetting processor.

U.S. patent (U.S. Pat. No. 5,012,268 to Hirai) describes an exposure control device for an interchangeable-lens camera in which factors preventing the establishment of a relationship, which ensures proper matching of the photographing lens and the camera body on both the lens, side and the camera body side are taken into account.

SUMMARY OF THE INVENTION

A principal object of the present invention is to achieve methods for the correction of aperture shading effects on images from digital camera systems with more than one aperture plane wherein the said aperture planes are axially distended from one another.

A further object of the invention is to calculate the convolution of the aperture function and the lens pupil function on an object-point-to-object-point basis A further object of the invention is to calculate aperture shading correction (ASC) parameters that undo the convolution results.

A further object of the invention is generating ASC parameters from a fit to a predictive equation form for aperture shading.

A further object of the invention is to multiply the system's LSC results by the system's ASC results for a full solution to both LSC and ASC.

In accordance with the objects of this invention a method for correction of aperture shading effects on images from digital camera systems with at least one pupil lens plane and a separate, axially-distended aperture plane has been disclosed. The method invented comprises the following steps: (1) providing a digital camera comprising at least one lens pupil plane and a separate aperture plane, (2) setting aperture and taking an image, (3) checking if object rays that pass through the pupil can be blocked by the aperture and, if so, go to step (6), else go to step (4), and (4) checking if object rays that pass through the aperture can be blocked by the pupil and, if so, go to step (6), else go to step (5). Furthermore the method invented comprises the steps of (5) performing lens shading correction and go to step (10); (6) performing lens shading correction, and (7) determining one or more variable camera system parameters to correct for aperture shading depending on corrective equation form elected. Finally the method comprises (8) generating ASC equation from said one or more camera system parameters determined, (9) applying the ASC correction to the captured image, and (10) end.

BRIEF DESCRIPTION OF THE DRAWINGS

In the accompanying drawings forming a material part of this description, there is shown.

DESCRIPTION OF THE PREFERRED EMBODIMENTS

Circuits and methods for correction of aperture shading effects on images from digital camera systems are disclosed.

Herein we will refer to the standard LSC blockage as the lens' pupil only, whereas we will refer to additional shading blockages as those due to the convolution of axially distended apertures with the said lens pupils. Thus, correction for the convolution of these additional apertures with the lens pupil will herein be called aperture-shading correction (ASC). Furthermore, an alternative lens shading correction may also be required when just the aperture blocks the incoming light (i.e., when no light ever strikes the lens pupil).

Figure 1:
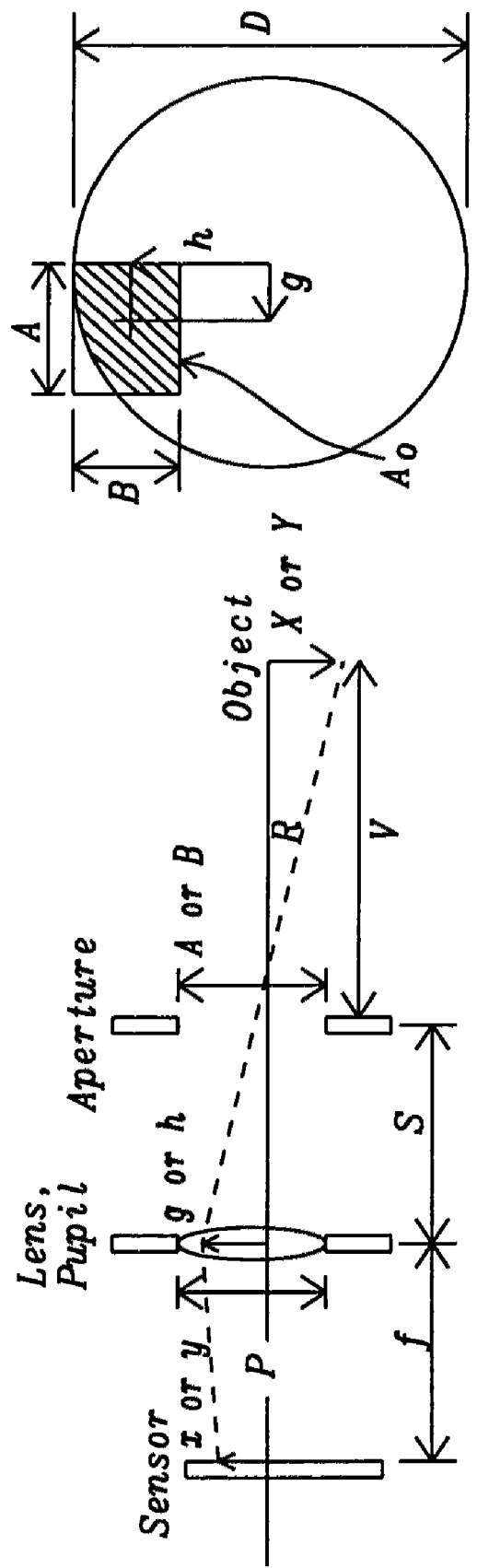
FIG. 1. illustrates the geometry for analyzing aperture shading.

FIG. 1. illustrates the geometry for analyzing aperture shading, wherein A, B=aperture width, P=pupil diameter, S=aperture-to-pupil separation, g, h=central point of aperture's shadow on pupil, R=ray angle into camera system, f=lens' focal length, x, y=image height on sensor, $A_o$=convolution overlap area used in calculating shading and relative f-number. The geometry used for calculation assumes that the object distance is much greater than lens' focal length.

Referring to the geometry of FIG. 1, a camera's imaging system consists of its lens of focal length f, its lens' pupil of diameter P, and its aperture of diameter A (and B). The distention between the pupil and the aperture is S and the ray angle for a given object point is R. The shadow cast by the aperture onto the pupil is then convolved with the pupil to determine how much of the object light will reach the image plane (where the image sensor is). The location of the aperture's shadow on the pupil is given in coordinates of g, h, with corresponding image height location of x, y, respectively. Finally, the convolution overlap area is given as $A_o$.

In this diagram, the object distance is assumed to be much greater than the lens' focal length such that the image distance is approximately equal to the lens' focal length. From this geometry, one can then observe that $$g = \frac{S \cdot x}{f} \quad (1)$$

$$h = \frac{S \cdot y}{f}$$

Figure 2:
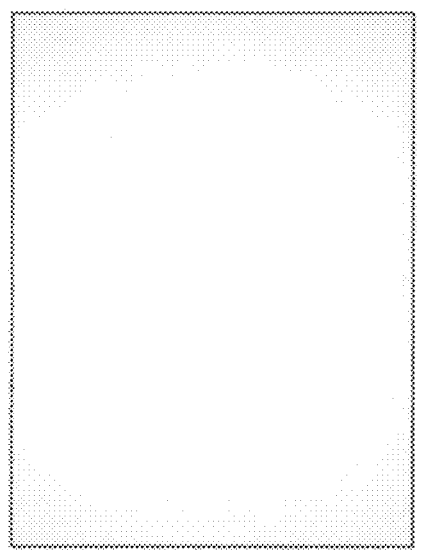
FIG. 2 *a-d* shows plots of modeled aperture shading showing the image field illumination.
Figure 2:
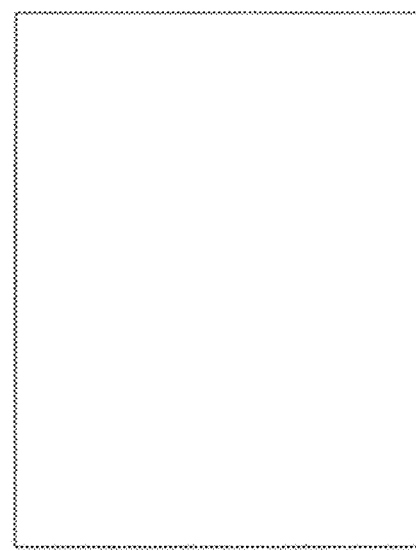
Figure 2:
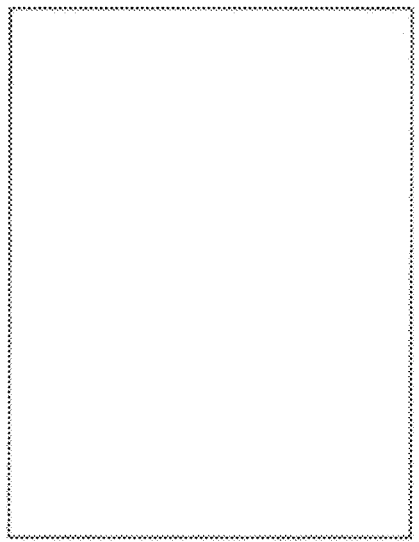
Figure 2:
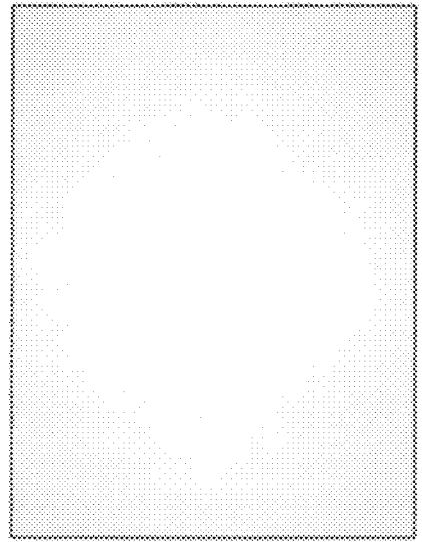

FIG. 2 shows plots of modeled aperture shading showing the image field illumination Performing a double convolution of the aperture's shadow on the pupil then produces aperture shading maps such as those diagrammed in FIG. 2, i.e. coordinates of areas impacted by aperture shading are determined by calculating double convolution of aperture function.

Herein, various camera system parameters have been input to demonstrate the aperture shading effect (omitting the typical cosine-fourth lens shading) due to a tandem aperture-pupil combination. As well, f=lens' focal length, f#eff=the effective f-number of the imaging system at the center of the image and RI=relative illumination=(darkest part of the image)/(brightest part of the image).

Returning to FIG. 2, in all cases of the plots shown, f=5.868 mm, P=2.06 mm, horizontal field of view=52 degrees, vertical field of view=39 degrees and S=1.0 mm. (a) A=B=0.94 mm, f#eff=5.6 (center), RI=93%. (b) A=B=1.28 mm, f#eff=4.0 (center), RI=78%. (c) A=B=2.06 mm, f#eff=2.85 (center), RI=71%. (d) A=B=3.0 mm, f#eff=2.85 (center), RI=100%. Herein, the f#eff is quoted only for the axial (center) rays.

To calculate the effective f-number of the system, the convolution overlap area, $A_o$, must be calculated from the double convolution of the aperture's shadow and the pupil. Then, an adaptation of the standard f-number equation can be applied, wherein the effective aperture diameter is calculated from the convolution overlap area and then placed in the standard f-number equation. This result is given in equation (2):

The effective f-number f#eff of the imaging system at the center of the image can be calculated by $$f\#\mathit{eff} = \frac{f}{D},$$

wherein D is the diameter of a (virtual) circle whose area is equal to the convolution overlap area calculated and f is the lens' focal length (see FIG. 1). The virtual circle area is $$A\mathit{circle} = \frac{\pi \times D^2}{4}$$

and an "effective" diameter (according to FIG. 1—convolution overlap area $A_0$):

$$D_{\mathit{eff}} = 2 \times \sqrt{\frac{A_0}{\pi}},$$

hence the effective f-number amounts to $$f\#_{\mathit{Eff}} = \frac{f \cdot \sqrt{\pi/A_o}}{2} \quad (2)$$

Figures 3A, 3B:
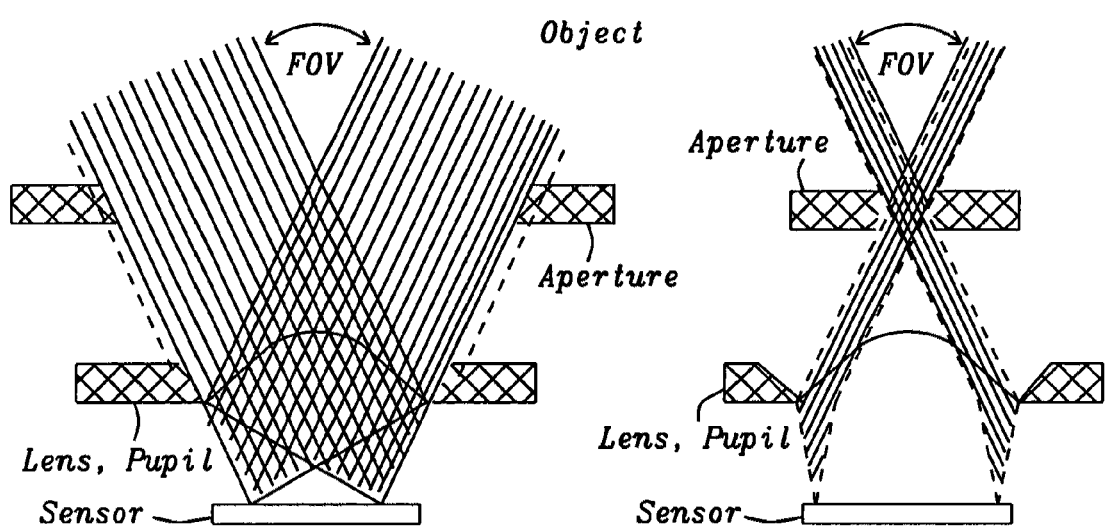
FIG. 3 *a-b* depicts two no-problem zones for aperture shading.

From FIG. 2, it is clear that aperture shading can be a serious problem even for mild pupil-aperture distentions S. As well, it is also recognized that there exist two so-called no-problem zones in the parameter space. These two zones occur when either the aperture diameter is sufficiently large such that object rays that the pupil can block never get blocked by the aperture or when the aperture diameter is sufficiently small such that object rays that the aperture blocks never get blocked by the pupil. These two cases are diagrammed in FIG. 3, showing two no-problem zones for aperture shading. They represent two of the solutions to aperture shading disclosed herein: very low f-number aperture or very high f-number aperture. However, it should be additionally noted that the lens shading in zone 3 will often be different than that in zone 1, because in zone 3 the distended aperture determines the passed rays while in zone 1 the lens' own pupil determines the passed rays. Even so, the zone 3 shading does not involve a convolution of the aperture and the pupil, as only the aperture is involved for all image heights (i.e., for all field angles). Both FIGS. 3(a) and (b) have a same field of view (FoV).

Referring to FIG. 3, two no-problem zones for aperture shading are: (a) wherein the aperture diameter is sufficiently large such that object rays that the pupil can block never get blocked by the aperture (for example, FIG. 2(d)) and (b) wherein the aperture diameter is sufficiently small such that object rays that the aperture blocks never get blocked by the pupil (for example, FIG. 2(a)).

Between the two no-problem zones diagrammed in FIG. 3 there exists the shading zone, zone 2, wherein which aperture shading must be actively corrected for as a function of image height. In this zone, the form and severity of the aperture shading varies with aperture width (A or B), pupil diameter (P), and pupil-to-aperture separation (S), as well as system field angle along any given axis. FIGS. 2(b) and 2(c) show good examples of this shading zone.

It is interesting to note that while the axial effective f-number in FIG. 2(c) is the same as that in FIG. 2(d), the aperture width in FIG. 2(d) is sufficiently large such that this system does not induce aperture shading whereas the aperture width in the system in FIG. 2(c) does induce aperture shading because while its aperture width is sufficient to not cast a shadow onto the pupil for axial rays, it is insufficient to not cast a shadow onto the pupil for non-axial rays.

To correct for aperture shading in the shading zone of a distended, or tandem, pupil-aperture imaging system, an aperture shading correction (ASC) algorithm can be applied to the system's output image pixel values. Many forms of ASC equations can exist, and can include image center offsets and separate parameters for orthogonal image plane coordinates. Consider, as an example, the use of a simple quadratic correction term:

$$C=1+q \cdot (IH)^2 \quad (3)$$

Herein, q is a variable parameter that depends on the camera system geometry and is generally a function of S (the pupil to aperture distention) and IH is the relative image height (0<IH<1). Any form of corrective equation could be used (Equation (3) simply represents an example). The parameter q can generally be best determined by either appropriate system modeling or experimental measurements. It should be noted that often a two-dimensional polynomial equation would provide a good enough fit in most cases.

Another form of the correction factor C of equation (3) is $$C = 1 + Q \times r^2,$$
$$\text{wherein } Q = \frac{q}{r_{max}^2}$$

and wherein r=image height and $r_{max}$=maximum image height.

In case of a f/4.0 design case $$q = 0.0075 \times \left(\frac{S}{100} - 4\right).$$

This equation can be used in companion chips or the image signal processing pipeline to generate the shading correction $$C=1+Q \times r^2$$

in case of f/4.

Figure 4:
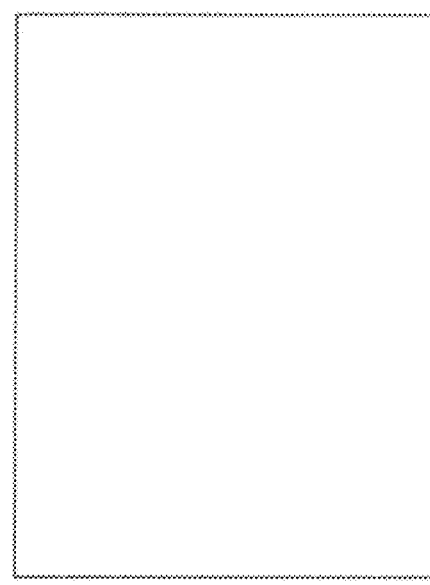
FIG. 4 *a-d* shows example cases for an axially distended f/4.0 aperture
Figure 4:
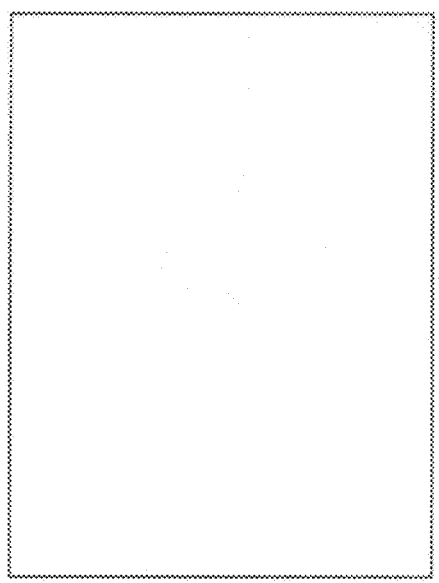
Figure 4:
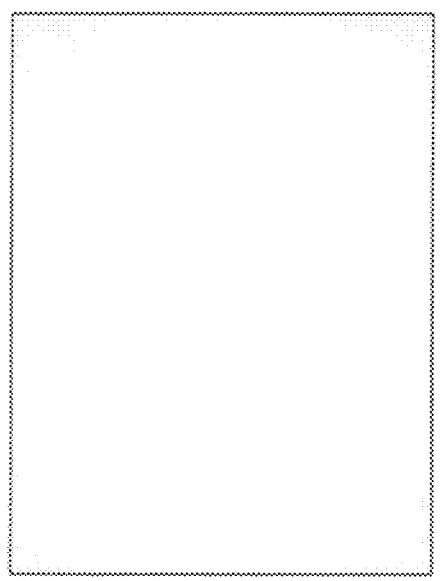
Figure 4:
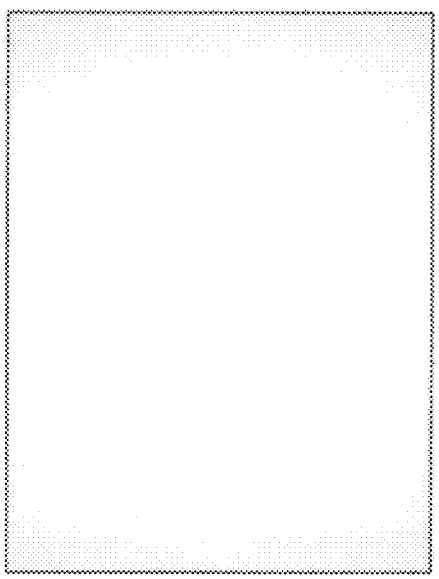

FIG. 4 then shows example cases for an axial f/4.0 aperture as per the other parameters in FIG. 2, except that in one case (FIG. 4(c) and FIG. 4(d)), the aperture to pupil separation (S) has been reduced from 1.0 mm to 0.85 mm. After aperture shading, Equation 3 is then applied with q=0.28 and 0.16, respectively.

Referring to FIG. 4, demonstrating aperture shading correction, luminance shading correction has been performed for f=5.868 mm, P=2.06 mm, horizontal field of view=52 degrees and vertical field of view=39 degrees. FIG. 4 (a) has the parameters A=B=1.28 mm, S=1.0 mm, f#eff=4.0 (center), RI=78%, no correction. FIG. 4 (b) corresponds to FIG. 4 (a) with correction using Equation (3) and q=0.28 such that now RI=93%. FIG. 4 (c) has the parameters A=B=1.29 mm, S=0.85 mm, f#eff=4.0 (center), RI=86%, no correction. FIG. 4 (d) corresponds to FIG. 4 (c) with correction using Equation (3) and q=0.16 such that now RI=96%.

Because q will be a function of S in most cases, and to save on system memory in case ASC is desired in the camera, a q versus S curve can be fitted to a simple generator equation and then system inputs, (such as S and A, B) can be used to generate q on the fly (during camera use). A potential generator equation for q (assuming the f/4.0 design case) could be as that given in Equation 4 below.

$$q=0.75 \cdot (S-0.4)^2 \quad (4)$$

Equation (4) assumes not only f/4.0 but also the specific case of a square aperture distended from a round pupil, as in the above parameters. It is just an example of a fit that creates a generator equation for q.

Figure 5:
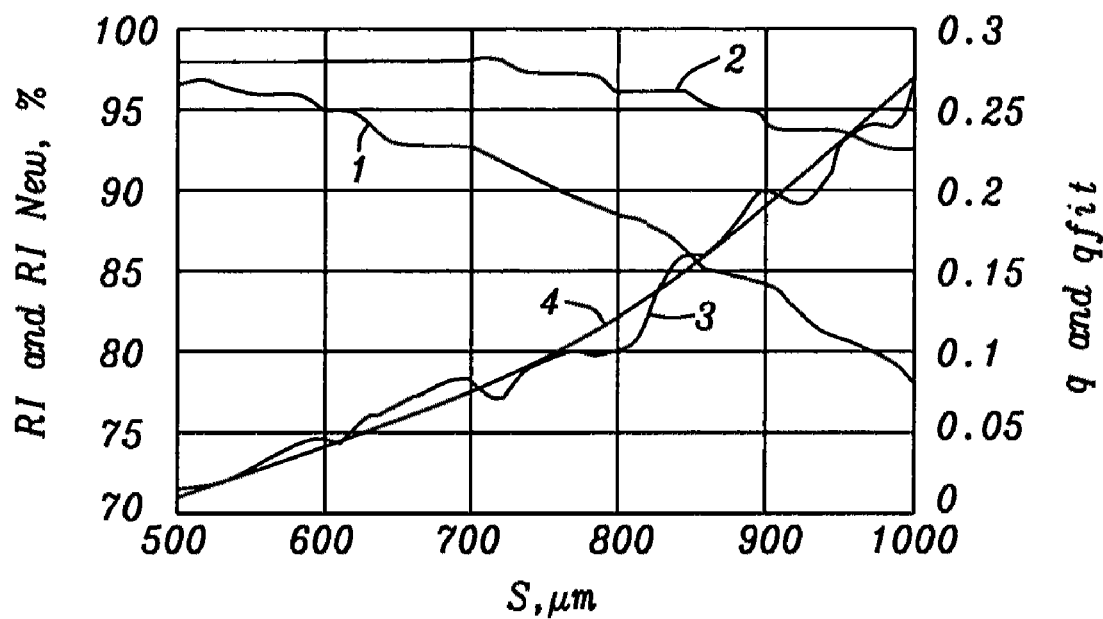
FIG. 5. depicts plots of uncorrected aperture shading and corrected aperture shading.

As an example of this, FIG. 5 shows a plot of the relative illumination values (curve 1) for the cases diagrammed in FIG. 4. Herein, S is allowed to vary from 0.5 mm to 1.0 mm, and then q is calculated for each S as per Equation (3). The q value calculated (curve 2) is the one that returns the highest RI curve in the corrected image. The corrected RI curve is then also shown (the red curve). Finally, Equation (4) is used to generate a curve fit (curve 4) to the numerical results obtained using Equation (3) for the best-case RI curves. The wiggliness in these curves is an artifact of quantization in the numerical simulations. What can be seen is that Equation (4) does an excellent job in generating the best-case q values for this particular camera system aperture setting (f/4.0). Thus, the methodology of generating a best-case q value from a simple equation is a valid solution to solving the aperture-shading problem with a minimal use of system memory (only a few coefficients needs to be stored for any given system f-number and then the current lens focal position is provided in real time).

Returning to FIG. 5, depicting plots of uncorrected RI (curve 1), corrected RI (curve 2), corresponding best-case q values (curve 3, from Equation (3)) and generated matching q values (curve 4, from Equation (4)). This shows how ASC can take typical RI values from unacceptable realms (i.e., mid-seventies) to acceptable realms (i.e., mid-nineties) even when the shading is complex but the correction equation is simple. It also verifies the use of a generator equation to create the ASC coefficients necessary for best-case correction.

It should be noted that ASC can either be a part of the standard LSC algorithm or it can be a stand-alone corrective algorithm that is implemented before or after the LSC is implemented. Typically, it may be most convenient to first implement the standard LSC in the sensor chip and then follow this by the implementation of the ASC in a companion chip or in the image signal-processing path. In such a case, the standard LSC would compensate for all shading (both luminance and color) that takes place in the absence of an additional aperture (or, for example, when an additional aperture is sufficiently wide open that it casts no shadow onto the lens' pupil), and then the ASC would fine tune that result to specifically compensate for aperture shading effects.

In addition to the above discussions, aperture shading will also impact system signal to noise ratios (SNR) and modulation transfer functions (MTF). The SNR will be impacted deleteriously because of the drop in received signal value at the image sensor during aperture shading. The MTF will be also impacted deleteriously because the overlap convolution area between the aperture's shadow and the lens' pupil will not always be centrally symmetric (thus, the point spread function, which is the Fourier transform of the net aperture width, will be asymmetric). Furthermore, the MTF is likely to become further degraded when the image processing attempts to improve the system SNR due to shading, as generally noise reduction algorithms produce a smoothing function, which reduces MTF. As such, both the SNR and the MTF will require additional compensation due to aperture shading.

The SNR and MTF compensation can be performed either as a part of the ASC algorithm or separately during image signal processing (ISP) stages. If the aperture-shading -induced SNR and MTF corrections take place separately from the luminance ASC, then the luminance ASC parameters could be passed to the subsequent ISP engine to instruct it how to modify its SNR and MTF tuning parameters.

Finally, because of color cross talk between pixels, ASC must generally be performed on individual color channels separately. This is because, during the use of a secondary aperture, both the cone angle and the ray angle of the light entering the pixels will change as the aperture width (A, B) and/or position (S) changes. This effect can be seen in FIG. 3. In FIG. 3(a) the cone angles of the light entering the pixels are wide, and thus significant cross-talk can exist. As well, the chief ray angles in this case are high toward the image perimeter, which also creates high cross talk. However, in FIG. 3(b), the restrictions on the incoming light imposed by the aperture dramatically decrease the cone angle, thereby decreasing the cross talk relative to the wide-open case. As well, the chief ray angles in this case remain low (in fact, they can even become fairly telecentric), even toward the image perimeter. As such, the cross talk in this case also remains low relative to the wide-open case. Thus, it would be necessary in most modern camera application that would seek to use multiple, tandem apertures to tune the camera system parameters for both luminance and chroma aperture shading effects. In the simplest manner, this can be accomplished by performing the ASC on the four Bayer color channels separately.

Figure 6:
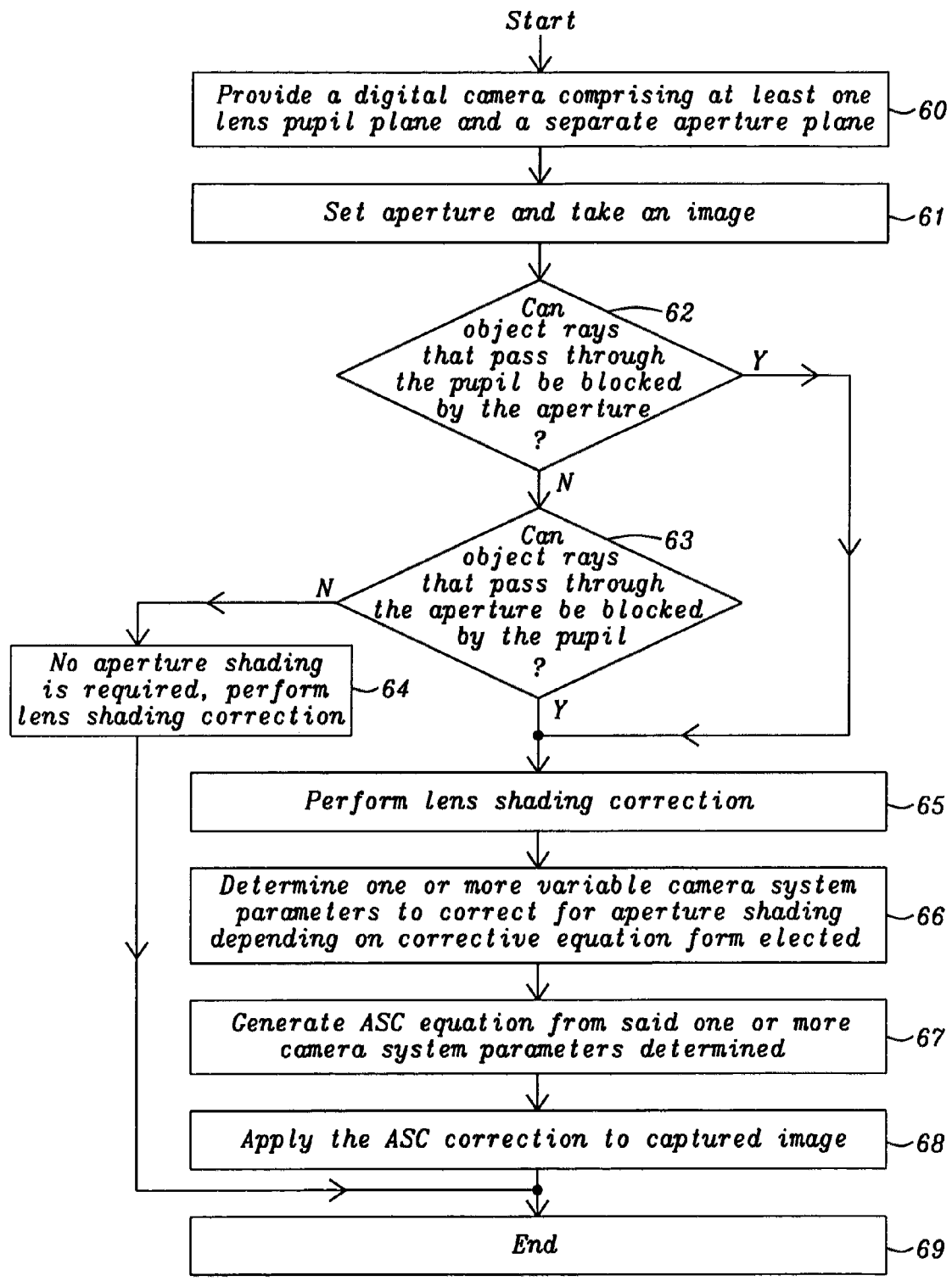
FIG. 6 illustrates a flowchart of a method invented for the correction of aperture shading effects on images from digital camera systems with at least one pupil lens plane and a separate, axially-distended aperture plane.

FIG. 6 illustrates a flowchart of a method invented for the correction of aperture shading effects on images from digital camera systems with at least one pupil lens plane and a separate aperture plane. A first step 60 describes the provision of a digital camera comprising at least one lens pupil plane and a separate aperture plane. A next step 61 illustrates setting aperture and taking an image. Step 62 is a check if object rays that pass through the pupil can be blocked by the aperture and, if so, go to step 65, else go to step 64. Step 63 is a check if object rays that pass through the aperture can be blocked by the pupil and, if so, go to step 65, else go to step 64. Step 64 discloses performing lens shading correction and go to end in step 69, while in this case no aperture shading correction is required. Step 65 illustrates performing lens shading correction. Step 66 starts aperture-shading correction by determining variable camera system parameter q or another one or more suitable parameters, depending on the elected correction equation form. The next step 67 describes generating an ASC equation from said one or more camera system parameters determined. In a preferred embodiment The ASC equation is $C=1+Q \times r^2$ wherein $Q=q/r_{max}^2$, wherein r=image height, referring in other words, to the distance of a pixel from the center of the image sensor. It should be noted that other forms of corrective equations could also be used alternatively. In the next step 68 the ASC correction is applied to a captured image. Step 69 signifies the end of shading correction of an image.

A more general equation for aperture shading correction can also be generated. For example, one such equation may take the form:

$$C = \sqrt{C_x^2 + C_y^2}, \text{ wherein}$$

$$C_x = \sum_{j=0}^{k} (a_j \cdot S + b_j \cdot f\# + c_j) \cdot \left(\frac{|x - x_0|}{x_m}\right)^j, \text{ and}$$

$$C_y = \sum_{j=0}^{k} (d_j \cdot S + e_j \cdot f\# + f_j) \cdot \left(\frac{|y - y_0|}{y_m}\right)^j.$$

In this equation above, C is the master corrective term, $C_x$ is the x-component of the correction, $C_y$ is the y-component of the correction, a-f are coefficients that are to be determined for the system, x is the image-space x position, y is the image-space y position, $x_0$ is the x-axis offset between the aperture and the pupil, $y_0$ is the y-axis offset between the aperture and the pupil, $x_m$ is the maximum image-space x position and $y_m$ is the maximum image-space y position. This two-dimension, high-order polynomial equation allows for various aperture-pupil offsets, aperture-pupil separations (distensions), and aperture shapes. While its complexity requires substantially more memory and processing time than simpler equations, it also allows for nearly perfect aperture shading correction in all cases.

In summary, the correction coefficients generate a multiplier that covers the entire image plane. If the center of the image before correction is the brightest part of the image, then its multiplier is "1." But, the correction equation creates a 2D sheet of values that are used to "Flatten" the scene luminance across the whole image plane as good as possible.

While the invention has been particularly shown and described with reference to the preferred embodiments thereof, it will be understood by those skilled in the art that various changes in form and details may be made without departing from the spirit and scope of the invention.

What is claimed is:

1. A method for the correction of aperture shading effects on images from digital camera systems with at least one pupil lens plane and a separate, axially distended aperture plane, comprising the following steps:
    (1) providing a digital camera comprising at least one lens pupil plane and a separate aperture plane;
    (2) setting aperture and taking an image;
    (3) checking if object rays that pass through the pupil can be blocked by the aperture and, if so, go to step (6), else go to step (4);
    (4) checking if object rays that pass through the aperture can be blocked by the pupil and, if so, go to step (6), else go to step (5);
    (5) performing lens shading correction and go to step (10);
    (6) performing lens shading correction;

(7) determining one or more Variable camera system parameters to correct for aperture shading depending on corrective equation form elected;
(8) generating aperture shading correction (ASC) equation from said one or more camera system parameters determined;
(9) applying the ASC to captured image; and
(10) end.

2. The method of claim 1 wherein said ASC is performed on each individual color channel separately.

3. The method of claim 2 wherein said ASC is performed on each of four Bayer channels separately.

4. The method of claim 1 wherein coordinates of areas impacted by aperture shading are Calculated by double convolution of aperture function and lens pupil function.

5. The method of claim 1 wherein said variable camera system parameter is a variable parameter q that depends on camera system geometry and is dependent on a pupil to aperture distention.

6. The method of claim 5 wherein the ASC equation is $C=1+Qxr^2$ wherein $Q=q/r_{max}^2$ and wherein r=image height.

7. The method of claim 1 wherein said variable camera system parameter q is calculated by storing coefficients required for any given lens focus position.

8. The method of claim 1 wherein the ASC is a part of a standard LSC algorithm.

9. The method of claim 1 wherein the ASC is a stand-alone corrective algorithm.

10. The method of claim 1 wherein a standard LSC algorithm is first implemented in an image sensor chip followed by an implementation of the ASC in a companion chip.

11. The method of claim 1 wherein a standard LSC algorithm is first implemented in an image sensor chip followed by an implementation of the ASC in an image signal processing path.

12. The method of claim 1 wherein SNR and MTF compensation is performed as a part of the aperture shading correction.

13. The method of claim 1 wherein SNR and MTF compensation is performed separately during image signal processing stages.

14. The method of claim 1 wherein the ASC equation creates a two-dimensional sheet of values over an image captured.

15. The method of claim 1 wherein the ASC equation is:

$$C = \sqrt{C_x^2 + C_y^2}, \text{ wherein}$$

$$C_x = \sum_{j=0}^{k} (a_j \cdot S + b_j \cdot f\# + c_j) \cdot \left(\frac{|x - x_0|}{x_m}\right)^j, \text{ and}$$

$$C_y = \sum_{j=0}^{k} (d_j \cdot S + e_j \cdot f\# + f_j) \cdot \left(\frac{|y - y_0|}{y_m}\right)^j, \text{ wherein}$$

$C_x$ is the x-component of the correction, $C_y$ is the y-component of the correction, a-f are coefficients that are to be determined for the system, x is the image-space x position, y is the image-space y position, $x_o$ is the x-axis offset between the aperture and the pupil, $Y_o$ is the y-axis offset between the aperture and the pupil, $X_m$ is the maximum image-space x position and $Y_m$ is the maximum image-space y position.

* * * * *